(12) United States Patent
Feyder

(10) Patent No.: US 7,487,103 B2
(45) Date of Patent: Feb. 3, 2009

(54) SYSTEM AND METHOD FOR ACCEPTING A RESERVATION BASED ON STATISTICAL PROFITABILITY

(75) Inventor: Leonid Feyder, Campbell, CA (US)

(73) Assignee: Versonix Corporation, San Jose, CA (US)

( * ) Notice: Subject to any disclaimer, the term of this patent is extended or adjusted under 35 U.S.C. 154(b) by 0 days.

(21) Appl. No.: 11/164,559

(22) Filed: Nov. 29, 2005

(65) Prior Publication Data

US 2007/0124181 A1    May 31, 2007

(51) Int. Cl.
*G06Q 10/00* (2006.01)
(52) U.S. Cl. .............................. 705/5; 705/1
(58) Field of Classification Search .......... 705/1, 705/5, 6
See application file for complete search history.

(56) References Cited

U.S. PATENT DOCUMENTS

| | | | |
|---|---|---|---|
| 4,775,936 A * | 10/1988 | Jung | 705/5 |
| 5,255,184 A | 10/1993 | Hornick et al. | |
| 5,270,921 A | 12/1993 | Hornick | |
| 5,918,209 A * | 6/1999 | Campbell et al. | 705/5 |
| 6,085,164 A | 7/2000 | Smith et al. | |
| 6,263,315 B1 | 7/2001 | Talluri | |
| 6,418,413 B2 | 7/2002 | DeMarcken et al. | |
| 6,804,658 B2 | 10/2004 | Lim et al. | |
| 6,895,381 B1 * | 5/2005 | Selby | 705/6 |
| 2002/0120492 A1 | 8/2002 | Phillips et al. | |
| 2003/0115093 A1 | 6/2003 | Lim et al. | |
| 2004/0158536 A1 * | 8/2004 | Kowal et al. | 705/400 |
| 2006/0022037 A1 * | 2/2006 | Strothmann et al. | 235/384 |

FOREIGN PATENT DOCUMENTS

WO    WO 2005050410 A2 *    6/2005

* cited by examiner

*Primary Examiner*—John W Hayes
*Assistant Examiner*—Shannon S Saliard
(74) *Attorney, Agent, or Firm*—Squire, Sanders & Dempsey L.L.P.

(57) ABSTRACT

A system and method enable the acceptance of transportation reservations based on statistical profitability. As such, overbooking is enabled when statistically profitable based on a confidence level and probability of space available.

9 Claims, 3 Drawing Sheets

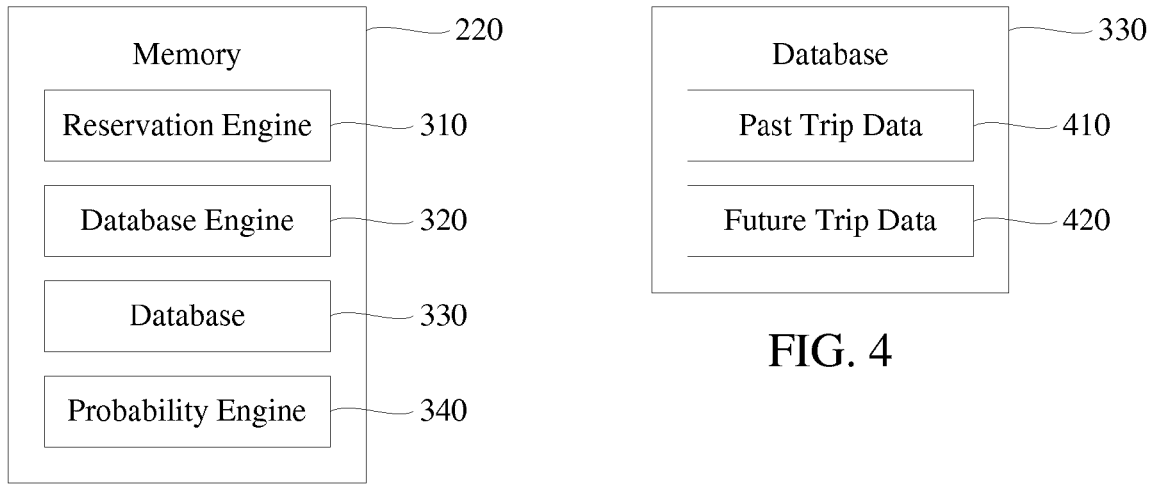
FIG. 3
FIG. 4
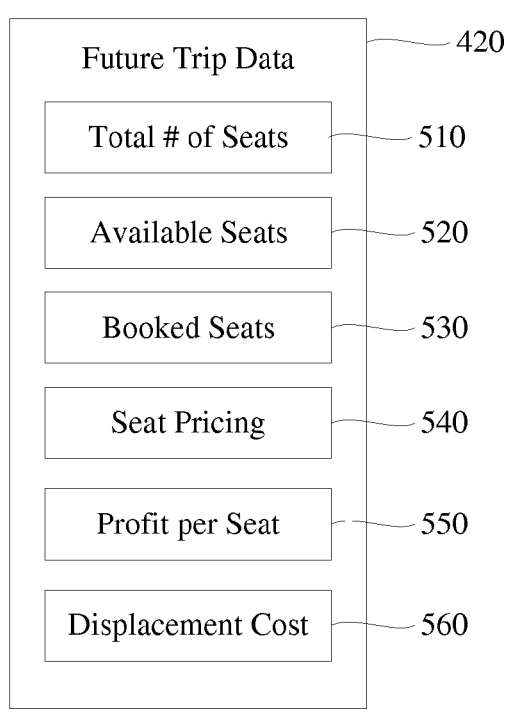
FIG. 5

SYSTEM AND METHOD FOR ACCEPTING A RESERVATION BASED ON STATISTICAL PROFITABILITY

TECHNICAL FIELD

This invention relates generally to reservation systems, and more particularly, but not exclusively, provides a system and method for determining whether to accept a reservation based on whether it is statistically profitable.

BACKGROUND

Conventional transportation reservation systems enable overbooking, which is the sale of access to transportation that exceeds the capacity of that transportation. Overbooking enables transportation companies to ensure that their vehicles are filled to or close to capacity based on the expectation that some transportation purchasers will cancel or otherwise not use their purchased access.

However, if no or only a few purchasers cancel and instead most decide to use their purchased access (i.e., more purchasers than space is available), the transport vehicle will not have enough capacity and some purchasers will be denied access despite their purchase. In the airline industry, overbooked purchasers can be scheduled on a later flight or even another airline in some circumstances, thereby ensuring the purchaser's access is fulfilled, albeit possibly at a loss to the transportation provider. Further, overbooking can generate bad will towards the transportation provider, particularly in the cruise industry where the number of cruise ships is limited. Accordingly, an overbooked passenger may not be able to be rescheduled onto another cruise ship because it may have a different destination and/or it may not sail for several days or even weeks later.

Accordingly, a new system and method is needed that more profitably provides for overbooking.

SUMMARY

The present invention provides a system and method for accepting reservations for transportation when they are statistically profitable. When a reservation request n is received for one of a set number X of items, such as airline seats, cruise cabins, rental cars, etc. first the reservation gets assigned a Probability rating of not being cancelled by the client and a required confidence level. The required confidence level is a measure of acceptable risk that takes into account the case where the request is granted, but at a later time it is determined that there is no space available in inventory to satisfy the given request. The required confidence level is $c=1/(1+R/Q)$, where Q is cost of not being able to fulfill that request (e.g., displacement cost) and operational profit from this reservation R=Price+Incremental Revenue−Variable Cost.

It is then determined if the past received # of reservations n−1 is less than the set X. If less, then the reservation request n is fulfilled.

Otherwise, to fulfill or decline a request the probabilities for existing reservations and the required confidence level for the new reservation are taken into account.

In an embodiment of the invention, the method comprises: receiving a reservation request for transportation; determining probability of space available; determining if the reservation is statistically profitable based on a confidence level and the determined probability; and accepting the reservation if it is statistically profitable.

In an embodiment of the invention, the system comprises a probability engine and a reservation engine. The probability engine determines a probability of space available for a received reservation. The reservation engine, which is communicatively coupled to the probability engine, determines if the reservation is statistically profitable based on a confidence level and the determined probability, and accepts the reservation if it is statistically profitable.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3 is a block diagram illustrating a memory of the reservation system of FIG. 1;

FIG. 4 is a block diagram illustrating a database of the memory of FIG. 3;

FIG. 5 is a block diagram illustrating future trip data of the database of FIG. 4.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
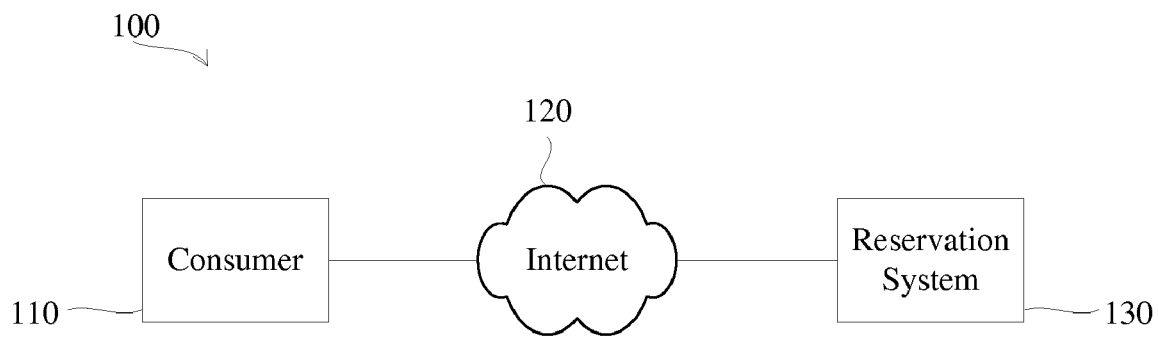
FIG. 1 is a block diagram illustrating a network in accordance with an embodiment of the invention.

FIG. 1 is a block diagram illustrating a network 100 in accordance with an embodiment of the invention. The network 100 includes a consumer 110 communicatively coupled to a network 120, such as the Internet, which is communicatively coupled to a reservation system 130. In an embodiment of the invention, additional nodes, such as additional consumers, can be communicatively coupled to the network 120. In another embodiment of the invention, the reservation system 130 is not connected to any network (e.g., for security reasons) and instead communication between the consumer 110 and the reservation system 130 is via an operator of the system 130 speaking with the consumer 110 via a voice network or in person.

In an embodiment of the invention, a consumer 110, using a computer or other device capable of communicating with the network 120, contacts the reservation system 130 in order to make a reservation for transportation on a specific date and time, such as a for a cruise cabin, train seat, bus seat, airplane seat, etc. In an embodiment of the invention, the reservation system 130 can also be used for scheduled cargo (e.g., for a container on a cargo ship). The reservation system 130 then determines if the required space (e.g., seat, cabin, etc.) is available. If space is available, the reservation is granted. Otherwise, the reservation system 130 determines if it is statistically profitable to grant the reservation, as will be discussed further below. If it is statistically profitable, the reservation is granted; otherwise, the reservation is denied and the consumer can select an alternate mode of transport or time for travel.

Figure 2:
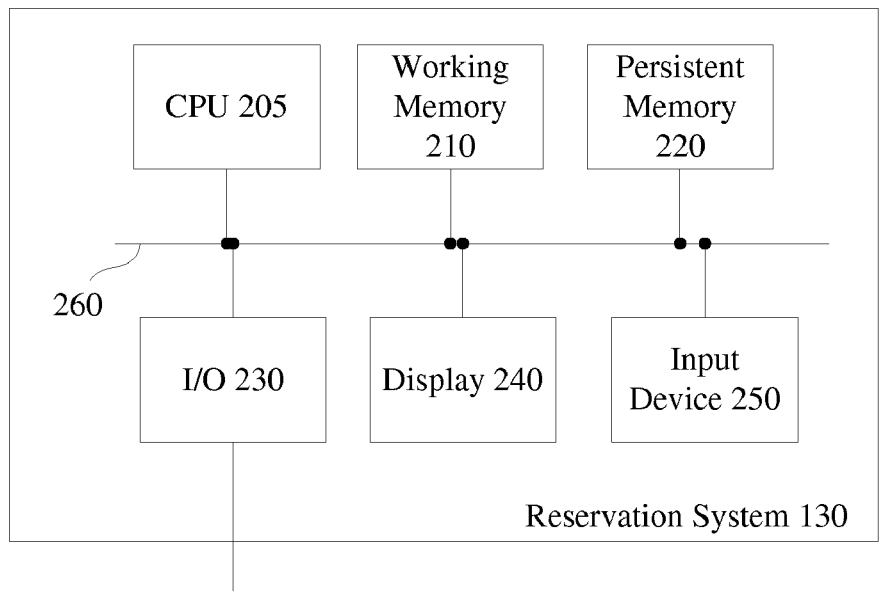
FIG. 2 is a block diagram illustrating a reservation system of FIG. 1.

FIG. 2 is a block diagram illustrating the reservation system 130. The reservation system 130 includes a central processing unit (CPU) 205; a working memory 210; a persistent memory 220; an input/output (I/O) interface 230; a display 240; and an input device 250; all communicatively coupled to each other via a bus 260. The CPU 205 may include an Intel Pentium microprocessor, or any other processor capable to execute software stored in the persistent memory 220. The working memory 210 may include random access memory (RAM) or any other type of read/write memory devices or combination of memory devices. The persistent memory 220 may include a hard drive, read only memory (ROM) or any other type of memory device or combination of memory devices that can retain data after the reservation system 130 is shut off. The I/O interface 230 can be communicatively coupled, via wired or wireless techniques, directly, or indirectly, to the network 120. The display 240 may include a flat panel display, cathode ray tube display, or any other display device. The input device 250, which is optional like other components of the invention, may include a keyboard, mouse, or other device for inputting data, or a combination of devices for inputting data.

In an embodiment of the invention, the reservation system 130 may also include additional devices, such as network connections, additional memory, additional processors, LANs, input/output lines for transferring information across a hardware channel, the Internet or an intranet, etc. One skilled in the art will also recognize that the programs and data may be received by and stored in the system 130 in alternative ways.

FIG. 3 is a block diagram illustrating the persistent memory 220 of the reservation system 130. The persistent memory 220 includes a reservation engine 310; a database engine 320; a database 330; and a probability engine 340. The reservation engine 310 receives a reservation request and determines whether or not to grant the reservation. Specifically, if space is available on the selected mode of transportation at the date and time specified, then the reservation engine 310 grants the reservation. In an embodiment, the grant can be conditioned on payment of at least a deposit.

If no space is available, then the reservation engine 310 determines if it is statistically profitable to overbook. The criteria for accepting a single reservation is:

$$(1-p)*A+p*[-P(NoSpace)*Q+P(SpaceAvailable)*R] \geq 0$$

wherein p is the probability that the customer will want to sail;

P(NoSpace) is the probability that space will not be available for the customer;

P(SpaceAvailable) is the probability that space will be available for the customer;

Operational profit R=Price+Incremental Revenue−Variable Cost;

Q is displacement cost for considered reservation;

P(NoSpace)+P(SpaceAvailable)=1; and

A is the cost of uncertainty; which is set to 0 in an embodiment of the invention.

Therefore, when A=0:

$$-P(NoSpace)*Q+P(SpaceAvailable)*R \geq 0$$

$$P(NoSpace)/P(SpaceAvailable) \leq R/Q.$$

Therefore, a confidence level c can be used for a given reservation. The confidence level is a measure of acceptable risk that in case a reservation is granted but at a later time it is determined that there is no space in inventory for the granted reservation.

The confidence level, c, is defined as:

$$c=1/(1+R/Q).$$

Accordingly, one can adjust the confidence level by adjusting the values for R and Q. For example: R=0.8*Price; Q=maximum of (3*Price, $300). The probability for available space is determined using a slightly modified normal distribution. In another embodiment, Student distribution can be used. Monte Carlo method can be used where in each realization monetary profit/loss is calculated for accepting reservation request, and depending on average profit/loss for all realizations decision to accept or not reservation is made.

The database engine 320 manages access to the database 330. The database 330 includes past trip data 410 and future trip data 420 (FIG. 4), as will be discussed in further detail below in conjunction with FIG. 5. In an embodiment, the data can be stored in multiple databases instead of a single database as shown.

The probability engine 340 calculates the probability that the client will not cancel a given reservation.

That probability value primary depends on monetary values, such as how much money has already been paid. Other parameters such as Agency, Sail, Group Type, etc . . . play the secondary role. Probability has a two layer structure, where monetary parameters constitute the first layer and other parameters the second layer.

FIG. 5 is a block diagram illustrating future trip data 420 of the database 330. The data 420 includes the total # of seats 510 for each future trip; the available seats (space) 520 for each future trip; the booked seats (space) 530 for each future trip; the seat price 540 for each future trip; the profit per sear 550 for each future trip; and the displacement cost 560 for each future. The profit 550 and displacement cost 560 correspond to B and C, respectively and can be set. In an embodiment of the invention, the future trip data 420 can include additional data. In an embodiment of the invention, the past trip data 410 can include data similar to data stored in the future trip data 420.

Figure 6:
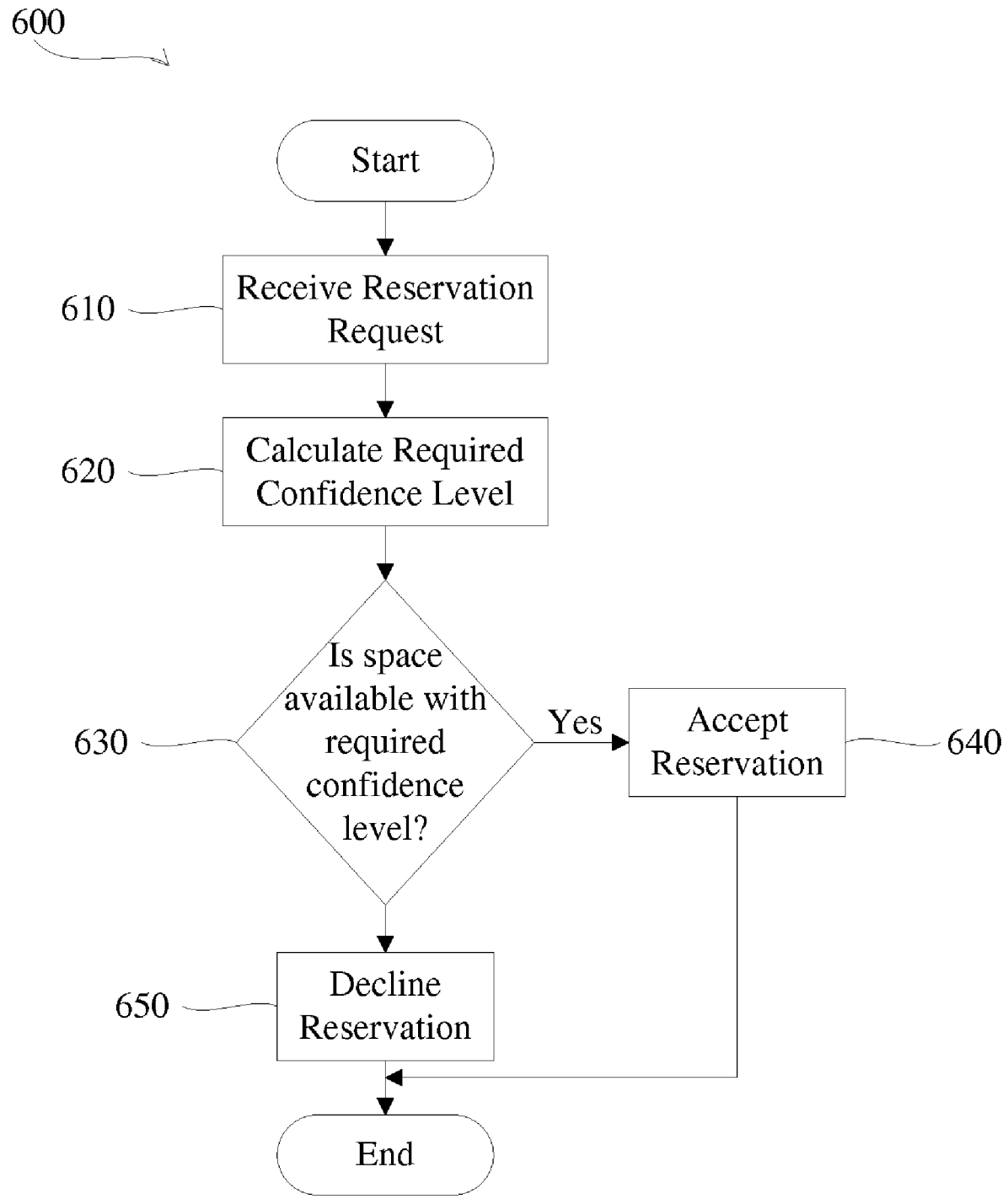
FIG. 6 is a flowchart illustrating a method of granting a reservation request.

FIG. 6 is a flowchart illustrating a method 600 of granting a reservation request. In an embodiment of the invention, the reservation system 130 implements the method 600. In an embodiment of the invention, the reservation system 130 can substantiate multiple instances of the method 600 for different reservation requests simultaneously. First, a reservation request is received (610). Then, a required confidence level is calculated (620). If (630) space is available with the required confidence level, then the reservation is accepted (640). Otherwise, the reservation is declined (650). The method 600 then ends.

The foregoing description of the illustrated embodiments of the present invention is by way of example only, and other variations and modifications of the above-described embodiments and methods are possible in light of the foregoing teaching. For example, the reservation system 130 can be used for cargo in place of transportation of persons. Although the network sites are being described as separate and distinct sites, one skilled in the art will recognize that these sites may be a part of an integral site, may each include portions of multiple sites, or may include combinations of single and multiple sites. Further, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A computer-based method, comprising:
receiving a reservation request for transportation;
determining if space is available;
   upon the occurrence that there is space available, accepting the reservation request;
   upon the occurrence that no space is available,
      determining probability of future space available, P(SpaceAvailable); and
      determining if overbooking is statistically profitable based on the determined probability;
         upon the occurrence that there is no space available and overbooking is statistically profitable, accepting the reservation request;
wherein determining if space is available and determining if the reservation is statistically profitable is accomplished with a processor, and
wherein determining if the reservation is statistically profitable is based on $$-P(\text{NoSpace})*Q + P(\text{SpaceAvailable})*R \geq 0$$

wherein
P(NoSpace) is the probability that space will not be available;
P(SpaceAvailable) is the probability that space will be available;
R is operational profit from the requested reservation; and
Q is displacement cost for the requested reservation.

2. The method of claim 1, wherein the transportation includes the transportation of cargo.

3. The method of claim 1, the method further comprising receiving payment of a deposit prior to acceptance of the reservation request.

4. A computer-readable medium having stored thereon instructions to cause a computer to execute a method, the method comprising:
receiving a reservation request for transportation;
determining if space is available;
   upon the occurrence that there is space available, accepting the reservation request;
   upon the occurrence that no space is available,
      determining probability of future space available, P(SpaceAvailable); and
      determining if overbooking is statistically profitable based on the determined probability;
         upon the occurrence that there is no space available and overbooking is statistically profitable, accepting the reservation request;
wherein determining if space is available and determining if the reservation is statistically profitable is accomplished with a processor; and
wherein determining if the reservation is statistically profitable is based on $$-P(\text{NoSpace})*Q + P(\text{SpaceAvailable})*R \geq 0$$

wherein
P(NoSpace) is the probability that space will not be available;
P(SpaceAvailable) is the probability that space will be available;
R is operational profit from the requested reservation; and
Q is displacement cost for the requested reservation.

5. A system comprising:
a processor configured to:
   determine a probability of current space available and future space available, P(SpaceAvailable), for a received reservation request; and
   determine if overbooking is statistically profitable based on the determined probability; and
a server configured to:
   accept the reservation request upon the occurrence that there is space available, or upon the occurrence that there is no space available and it is statistically profitable to overbook;
wherein the processor determines if overbooking is statistically profitable based on $$-P(\text{NoSpace})*Q + P(\text{SpaceAvailable})*R \geq 0$$

wherein
P(NoSpace) is the probability that space will not be available;
P(SpaceAvailable) is the probability that space will be available;
R is operational profit from the requested reservation; and
Q is displacement cost for the requested reservation.

6. The system of claim 5, wherein the transportation includes the transportation of cargo.

7. The system of claim 5, wherein the processor is further capable of requiring receipt of payment of a deposit prior to acceptance of the reservation request.

8. The method of claim 1, wherein determining if the reservation is statistically profitable is based on $$(1-p)*A + p*[-P(\text{NoSpace})*Q + P(\text{SpaceAvailable})*R] \geq 0$$

Wherein
P(NoSpace) is the probability that space will not be available;
P(SpaceAvailable) is the probability that space will be available;
R is operational profit from the requested reservation;
Q is displacement cost for the requested reservation;
p is the probability that requester of the reservation will not cancel the reservation if the reservation request is accepted;
A is the cost of uncertainty; and $$P(\text{NoSpace}) + P(\text{SpaceAvailable}) = 1.$$

9. The system of claim 5, wherein the processor determines if overbooking is statistically profitable is based on $$(1-p)*A + p*[-P(\text{NoSpace})*Q + P(\text{SpaceAvailable})*R] \geq 0$$

wherein
p is the probability that the requester of the reservation will not cancel the reservation if the reservation request is accepted;
P(NoSpace) is the probability that space will not be available;
P(SpaceAvailable) is the probability that space will be available;
R=Price+Incremental Revenue−Variable Cost;
Q is displacement cost for the requested reservation;
P(NoSpace)+P(SpaceAvailable)=1; and
A is the cost of uncertainty.

* * * * *